United States Patent
Kim et al.

(10) Patent No.: US 9,574,687 B2
(45) Date of Patent: Feb. 21, 2017

(54) VIBRATION PREVENTING INTERCOOLER PIPE

(71) Applicants: Hyundai Motor Company, Seoul (KR); Kia Motors Corporation, Seoul (KR)

(72) Inventors: Gi Hwan Kim, Gyeonggi-do (KR); Chi Hoon Choi, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 165 days.

(21) Appl. No.: 14/569,648

(22) Filed: Dec. 13, 2014

(65) Prior Publication Data

US 2015/0361933 A1 Dec. 17, 2015

(30) Foreign Application Priority Data

Jun. 17, 2014 (KR) .................. 10-2014-0073546

(51) Int. Cl.

| F16L 9/14 | (2006.01) |
| --- | --- |
| F16L 9/21 | (2006.01) |
| F02M 35/10 | (2006.01) |
| F02M 35/12 | (2006.01) |
| F02B 29/04 | (2006.01) |

(52) U.S. Cl.
CPC ........... *F16L 9/21* (2013.01); *F02M 35/10131* (2013.01); *F02M 35/10137* (2013.01); *F02M 35/10334* (2013.01); *F02M 35/1277* (2013.01); *F02B 29/045* (2013.01)

(58) Field of Classification Search
CPC .............................. F16L 9/21; F02M 35/10137
USPC ................... 138/121, 122, 137, 140, 141
See application file for complete search history.

(56) References Cited

U.S. PATENT DOCUMENTS

| 4,587,145 | A | * | 5/1986 | Kanao | .................. | B29C 53/582 |
| | | | | | | 138/129 |
| 5,792,532 | A | * | 8/1998 | Pfleger | .................. | F16L 11/118 |
| | | | | | | 138/121 |
| 6,216,742 | B1 | * | 4/2001 | Masui | ................ | B60H 1/00557 |
| | | | | | | 138/121 |
| 6,244,303 | B1 | * | 6/2001 | Adams | .................. | F16L 11/081 |
| | | | | | | 138/122 |
| 6,321,794 | B1 | * | 11/2001 | Ishida | .................... | F16L 11/118 |
| | | | | | | 138/121 |
| 6,604,551 | B2 | * | 8/2003 | Nishi | ........................ | B32B 1/08 |
| | | | | | | 138/121 |
| 7,478,652 | B2 | * | 1/2009 | Sakazaki | .................. | F16L 11/11 |
| | | | | | | 138/121 |

(Continued)

FOREIGN PATENT DOCUMENTS

| JP | H06-008384 Y2 | 3/1994 |
| --- | --- | --- |
| JP | 2002-355849 A | 12/2002 |

(Continued)

*Primary Examiner* — Patrick F Brinson
(74) *Attorney, Agent, or Firm* — Mintz Levin Cohn Ferris Glovsky and Popeo, P.C.; Peter F. Corless

(57) ABSTRACT

An intercooler pipe that improves noise, vibration, and harshness (NVH) performance is provided. The intercooler pipe includes a plurality of bellowses, wherein an exterior of the bellows is made of a soft material and an inside thereof is made of a hard material to make a storage modulus of the inside of the bellows greater than that of the exterior thereof. In addition, the intercooler pipe improves the durability of an intercooler pipe.

8 Claims, 3 Drawing Sheets

(56) References Cited

U.S. PATENT DOCUMENTS

| | | | |
|---|---|---|---|
| 2006/0042711 A1* | 3/2006 | Hibino | F16L 11/115 |
| | | | 138/121 |
| 2007/0221282 A1* | 9/2007 | Sakazaki | F16L 11/11 |
| | | | 138/121 |
| 2011/0120584 A1 | 5/2011 | Youn et al. | |
| 2013/0056109 A1* | 3/2013 | Yajima | F16L 11/111 |
| | | | 138/141 |

FOREIGN PATENT DOCUMENTS

| KR | 10-2002-0032873 A | 5/2002 |
|---|---|---|
| KR | 20-0416884 Y1 | 5/2006 |
| KR | 10-2011-0019918 A | 3/2011 |
| KR | 10-2011-0037629 A | 4/2011 |
| KR | 10-1198673 B1 | 11/2012 |

\* cited by examiner

VIBRATION PREVENTING INTERCOOLER PIPE

CROSS-REFERENCE TO RELATED APPLICATION(S)

This application is based on and claims the benefit of Korean Patent Application No. 10-2014-0073546, filed on Jun. 17, 2014 in the Korean Intellectual Property Office, the disclosure of which is incorporated herein in its entirety by reference.

TECHNICAL FIELD

The present disclosure relates to an intercooler pipe, and more particularly, to an intercooler pipe that may prevent vibrations from being transferred to the intercooler and a side member of a vehicle body through the intercooler pipe, which may improve noise, vibration, and harshness (NVH) performance.

BACKGROUND

Generally, an intercooler pipe includes an inlet pipe formed into an intercooler and an outlet pipe formed out from the intercooler and connects the intercooler and an engine throttle body to transfer air cooled in the intercooler to the engine throttle body. In particular, the intercooler pipe performs the channel function through which air is transferred, and non-combustion gas remaining after being combusted within an engine increases in temperature and pressure, which may be input to an engine combustion chamber using an intake manifold via the intercooler pipe at an inlet side.

However, the intercooler pipe according to the related art is a plastic intercooler pipe, which includes a clamp that fixes rubber hoses to both ends of an aluminum pipe that has a composite structure of rubber/aluminum and is made of thermoplastic ether ester elastomer (IEEE) to decrease a cost and a weight of the intercooler pipe, but may have low NVH performance when mounted within a vehicle and therefore may not be applied to a vehicle.

SUMMARY

The present disclosure provides an intercooler pipe that may include a bellows that has an interior made of a first material and an exterior made of a second material to prevent transfers of vibrations to the intercooler and a side member of a vehicle body via the intercooler pipe, which may improve noise, vibration, and harshness (NVH) performance.

According to an exemplary embodiment of the present disclosure, an intercooler pipe connects an intercooler to an engine throttle body, wherein both ends of the intercooler pipe may include bellowses and an exterior of the bellow may be made of a polyester (PET) material, which is a substantially soft material, and an inside thereof may be made of a polybutylene terephthalate (PBT) material, which is a substantially hard material, to make a storage modulus of the inside of the bellows greater than a storage modulus of the exterior thereof.

A thickness of the bellows of the intercooler pipe may be about 1.2 millimeters (mm) to about 1.4 mm to reduce vibrations transferred to the intercooler pipe. A material that forms the inside of the bellows of the intercooler pipe may have a storage modulus of about 7.5 times to about 8.5 times greater than a storage modulus of material that forms the exterior of the bellows. The polyester (PET) may occupy a thickness of about 95% to about 98% of a cross sectional thickness of the bellows of the intercooler pipe and the polybutylene terephthalate (PBT) may occupy a thickness of about 2% to about 5% of the cross sectional thickness of the bellows. Both ends of the intercooler pipe may include bent parts. Further, both ends of the intercooler pipe may include first bellowses and the bent parts of both sides of the intercooler pipe may include second bellowses.

BRIEF DESCRIPTION OF THE DRAWINGS

The above and other objects, features and advantages of the present disclosure will be more apparent from the following detailed description taken in conjunction with the accompanying drawings, wherein.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Exemplary embodiments of the present disclosure will be described below in detail with reference to the accompanying drawings.

Figure 1:
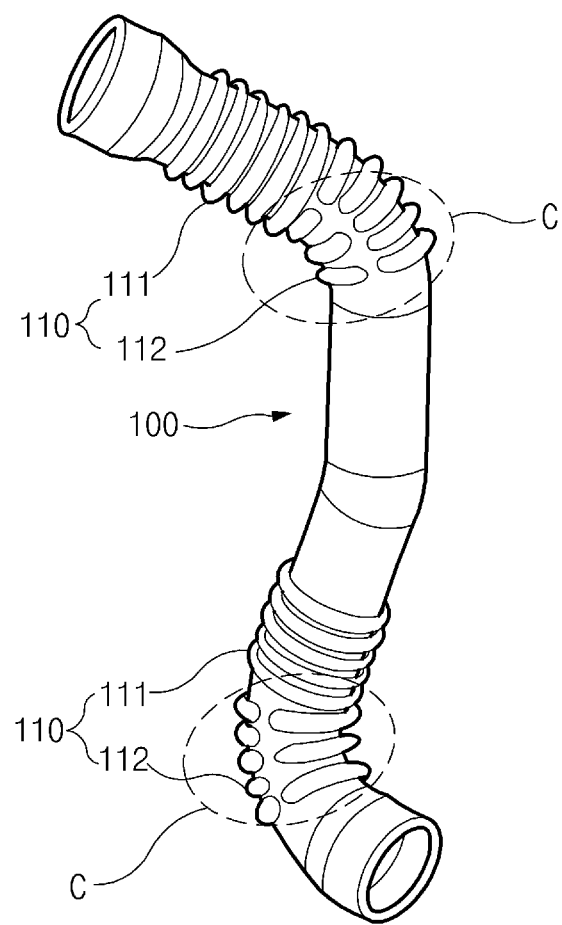
FIGS. 1 and 2 are exemplary diagrams illustrating an intercooler pipe according to an exemplary embodiment of the present disclosure.
Figure 2:
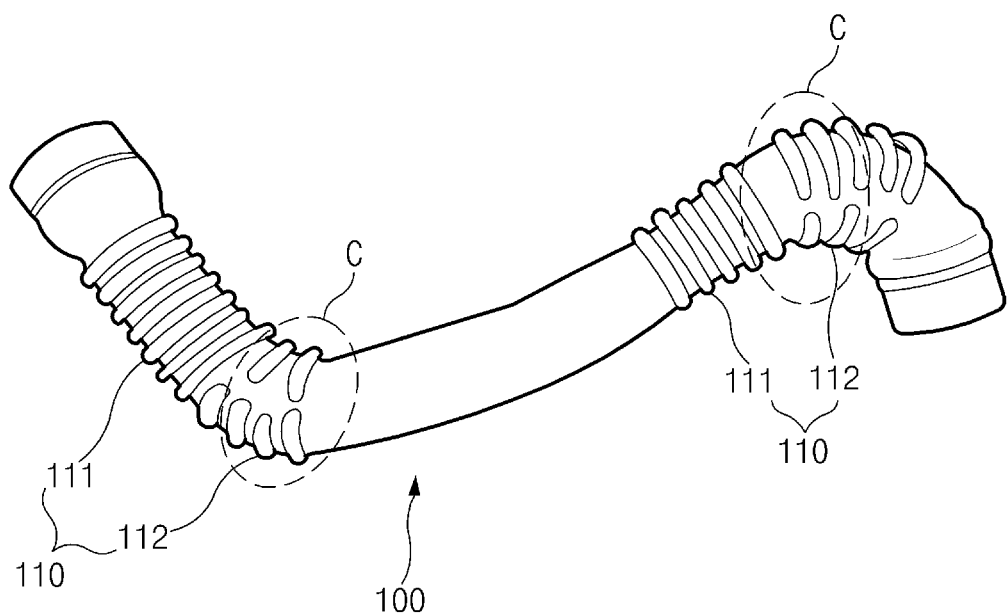
Figure 3:
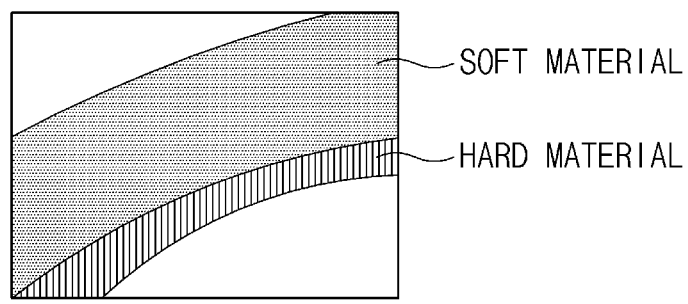
FIG. 3 is an exemplary cross-sectional view illustrating a bellows of the intercooler pipe according to an exemplary embodiment of the present disclosure.
Figure 4:
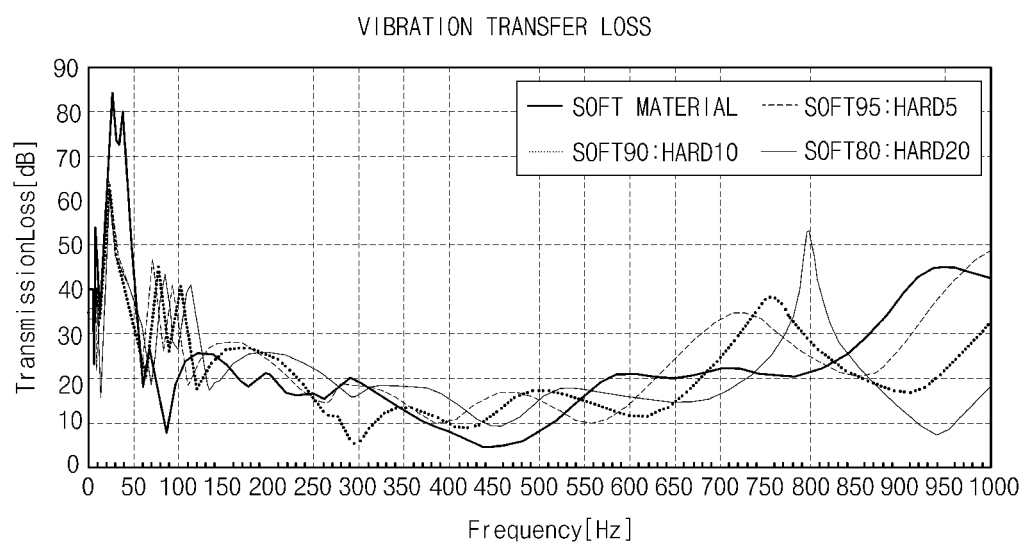
FIG. 4 is an exemplary graph illustrating an analysis value of a vibration transfer loss for the intercooler pipe according to an exemplary embodiment of the present disclosure.

As illustrated in FIGS. 1 to 3, an intercooler pipe according to an exemplary embodiment of the present disclosure may include bellowses 110 at both ends of the intercooler pipe 100, wherein an exterior of the bellows 110 may be made of a soft material and an inside thereof may be made of a hard material to improve NVH performance. The intercooler pipe 100 may be a plastic pipe that has a low vibration transfer characteristic structure that connects an intercooler of a vehicle to an engine throttle body.

Meanwhile, the intercooler pipe may vibrate due to impedance characteristics of a component through which the vibrations are transferred. In other words, when a shape of the component through which the vibrations are transferred is substantially constant or a material of the medium is about the same, the intercooler pipe may have a minimal variation of impedance and thus may have characteristics that more easily transfer vibration. In particular, the variation of the impedance of the medium relates a variation of mass, hardness, and damping of the medium. In other words, as the variation of the mass, hardness, and damping between a vibration point, at which vibrations are applied, from the medium and a vibration receiving point, at which vibrations are received, increases, the variation of the impedance between the vibration point and the vibration receiving point of the medium may also continually increases, thus a discrepancy of the impedance between the vibration point and the vibration receiving point may exist. In addition, when the discrepancy of the impedance is substantial, a progressive wave of the vibrations may be reflected, thus the vibrations transferred through the medium may be reduced.

Furthermore, to apply the discrepancy of the impedance to the intercooler pipe according to an exemplary embodiment of the present invention, the inside and the exterior of the intercooler pipe may be made of different materials. In particular, both ends of the intercooler pipe 100 may include the bellowses 110 to improve the NVH performance and the exterior and the inside of the bellows 110 may be made of different materials to minimize a thickness of a wall surface of the bellows 110 and improve durability thereof. In other words, as illustrated in HG. 3, the exterior of the bellows 110 may be made of a polyester (PET) material, which is a substantially soft material, and the inside thereof may be made of a polybutylene terephthalate (PBT) material, which is a substantially hard material, which may improve the NVH performance and durability of the intercooler pipe 100. In particular, a material that forms the inside of the bellows 110 of the intercooler pipe 100 have a storage modulus about 7.5 times to about 8.5 times greater than that of a material forming the exterior thereof.

The polyester (PET) may be a thickness of about 95% to about 98% of the bellows 110 and the polybutylene terephthalate (PBT) may be a thickness of about 2% to about 5% of the bellows 110 and thus the exterior and the inside of the bellows 110 of the intercooler pipe 100 may be made of different materials to secure elasticity of the bellows 110, which may improve the durability and the NVH performance of the intercooler pipe 100.

Accordingly, for the present disclosure to improve the durability of the intercooler pipe, as a result of analyzing the vibration transfer loss (e.g., NVH performance) for the intercooler pipe 100 by adjusting a component ratio of the soft material and the hard material of the intercooler pipe 100 to be different, as illustrated in HG. 4, when the bellows 110 of the intercooler pipe 100 is made of a soft material of about 95% and a hard material of about 5%, the NVH performance may be greater than that of the intercooler pipe 100 that uses the soft material of the related art, in particular, the performance may be improved within a range of about 100 hertz (Hz) to about 250 Hz, which may be a frequency of interest. In other words, when the polyester (PET) has a component ratio of about 95% to about 98% and the polybutylene terephthalate (PBT) has a component ratio of about 2% to about 5%, the NVH performance and the durability may increase. Meanwhile, as illustrated in FIGS. 1 and 2, the thickness of the bellows 110 of the intercooler pipe 100 may be about 1.2 millimeters (mm) to about 1.4 mm to reduce the vibrations transferred to the intercooler pipe 100. In particular, both ends of the intercooler pipe 100 may include bent parts C and thus the intercooler pipe 100 may be more easily mounted on the intercooler and the engine throttle body.

Further, the bellowses 110 disposed at both ends of the intercooler pipe 100 may include a plurality of first bellowses 111 and a plurality of second bellowses 112 to provide substantially straight parts of both sides of the intercooler pipe 100 with the first bellowses 111 and the bent parts C of both sides of the intercooler pipe 100 with the second bellowses 112. In the configuration as described above, the first bellowses 111 may be densely disposed at the substantially straight parts of both sides of the intercooler pipe 100 and the second bellowses 112 may be sparsely disposed on an outer side of the intercooler pipe 100 Accordingly, the intercooler pipe may connect the intercooler of the vehicle to the engine throttle body and both ends of the intercooler pipe 100 may include the bellowses 110 that have a predetermined thickness of which the exterior may be made of the soft material and the inside may be made of the hard material to improve the NVH performance, the quality of commodities of the vehicle, and the durability of the intercooler pipe to improve the safety.

As described above, according to the exemplary embodiments of the present disclosure, the intercooler pipe may include bellows of which the inside and the exterior may be made of different materials and the storage modulus of the inside of the bellows may be greater than that of the exterior thereof to prevent the vibrations from being transferred to the intercooler and the side member of the vehicle body via the intercooler pipe, which may improve the NVH performance to improve the quality of commodities of the vehicle and improve the durability of the intercooler pipe to improve the safety.

As described above, although the present disclosure has been described with reference to exemplary embodiments and the accompanying drawings, it would be appreciated by those skilled in the art that the present disclosure is not limited thereto but various modifications and alterations might be made without departing from the scope defined in the following claims.

What is claimed is:

1. An intercooler pipe that connects an intercooler to an engine throttle body, comprising:
   a plurality of bellowses disposed at both ends of the intercooler pipe,
   wherein an exterior of the bellows is made a soft material and an inside thereof is made of a hard material to make a storage modulus of the inside of the bellows be greater than that of the exterior thereof,
   wherein the hard material is a polybutylene terephthalate material.

2. The intercooler pipe according to claim 1, wherein a thickness of the bellows of the intercooler pipe is about 1.2 millimeters (mm) to about 1.4 mm to reduce vibrations transferred to the intercooler pipe.

3. The intercooler pipe according to claim 1, wherein the soft material is a polyester material.

4. The intercooler pipe according to claim 1, wherein the hard material has a storage modulus about 7.5 times to about 8.5 times greater than that of the soft material.

5. The intercooler pipe according to claim 1, wherein the soft material has a thickness of about 95% to about 98% a cross sectional thickness of the bellows and the hard material has a thickness of about 2% to about 5% of the cross sectional thickness of the bellows.

6. The intercooler pipe according to claim 1, wherein both ends of the intercooler pipe include bent parts.

7. The intercooler pipe according to claim 6, wherein both ends of the intercooler pipe include first bellowses and the bent parts of both sides of the intercooler pipe include second bellowses.

8. A vehicle having the intercooler pipe of claim 1.

* * * * *